United States Patent
Jiang et al.

(10) Patent No.: US 12,148,005 B2
(45) Date of Patent: *Nov. 19, 2024

(54) MEDIA INFORMATION PRESENTATION METHOD, SERVER, AND STORAGE MEDIUM

(71) Applicant: Tencent Technology (Shenzhen) Company Limited, Shenzhen (CN)

(72) Inventors: Mengting Jiang, Shenzhen (CN); Zhendong Tang, Shenzhen (CN); Qin Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/313,812

(22) Filed: May 6, 2021

(65) Prior Publication Data

US 2021/0256566 A1    Aug. 19, 2021

Related U.S. Application Data

(63) Continuation of application No. 16/030,750, filed on Jul. 9, 2018, now Pat. No. 11,030,656, which is a (Continued)

(30) Foreign Application Priority Data

Jun. 1, 2016    (CN) .......................... 201610379714.7

(51) Int. Cl.
G06Q 30/00    (2023.01)
G06F 16/00    (2019.01)
(Continued)

(52) U.S. Cl.
CPC ......... *G06Q 30/0269* (2013.01); *G06F 16/00* (2019.01); *G06F 16/435* (2019.01);
(Continued)

(58) Field of Classification Search
None
See application file for complete search history.

(56) References Cited

U.S. PATENT DOCUMENTS 8,924,465 B1    12/2014   Tunguz-Zawislak
9,560,157 B1 *  1/2017    Zuccarino ............. H04L 67/306
(Continued)

FOREIGN PATENT DOCUMENTS

CN    101916286 A    12/2010
CN    102375844 A    3/2012
(Continued)

OTHER PUBLICATIONS

Tencent Technology, ISRWO, PCT/CN2017/085834, Aug. 17, 2017, 7 pgs.
(Continued)

*Primary Examiner* — Michael W Schmucker
(74) *Attorney, Agent, or Firm* — Morgan, Lewis & Bockius LLP

(57) ABSTRACT

The present disclosure discloses a media information presentation method performed at a computer server communicatively connected to a plurality of terminals associated with a social networking platform. The method includes: receiving a plurality of media information operation messages, each message indicating an operation performed on a piece of advertisement by one of a first group of users; deriving a second group of users that are direct connections of the first group of users; collecting, from the media information operation messages, statistics on operation statistical data of the second group of users; and receiving a
(Continued)

| Second user | Social relationship chain | | |
|---|---|---|---|
| | First user therein | Popularity coefficient | Popularity level |
| Friend A1 | User A | 80% | Intimate relationship (direct friend) |
| | User C | 30% | Weak relationship chain (indirect friend) |
| | User D | 50% | Strong relationship chain (direct friend) | media information obtaining request from a respective user of the second group of users at a terminal; in response to the request, identifying a plurality of pieces of advertisement corresponding to the respective user; sorting them according to their corresponding operation weights; and returning, to the terminal, top L pieces of advertisement in the descending order.

17 Claims, 9 Drawing Sheets

Related U.S. Application Data continuation-in-part of application No. PCT/CN2017/085834, filed on May 25, 2017.

(51) Int. Cl.
*G06F 16/435* (2019.01)
*G06F 16/9535* (2019.01)
*G06Q 30/0251* (2023.01)
*G06Q 50/00* (2012.01)
*H04L 67/10* (2022.01)

(52) U.S. Cl.
CPC ......... *G06F 16/9535* (2019.01); *G06Q 50/01* (2013.01); *H04L 67/10* (2013.01)

(56) References Cited

U.S. PATENT DOCUMENTS

| | | | |
|---|---|---|---|
| 2011/0154220 A1* | 6/2011 | Chunilal | G06F 8/65 |
| | | | 715/751 |
| 2011/0264519 A1* | 10/2011 | Chan | G06Q 30/0251 |
| | | | 705/14.49 |
| 2012/0158476 A1 | 6/2012 | Neystadt et al. | |
| 2013/0151530 A1 | 6/2013 | Chen et al. | |
| 2014/0214818 A1* | 7/2014 | Du | G06Q 50/01 |
| | | | 707/723 |
| 2014/0237467 A1* | 8/2014 | Heddleston | G06Q 30/0251 |
| | | | 717/176 |
| 2014/0297739 A1 | 10/2014 | Stein et al. | |

FOREIGN PATENT DOCUMENTS

| | | |
|---|---|---|
| CN | 104090884 A | 10/2014 |
| CN | 104573113 A | 4/2015 |
| CN | 105608125 A | 5/2016 |
| CN | 106126519 A | 11/2016 |
| JP | 2015508542 A | 3/2015 |
| JP | 2015181036 A | 10/2015 |
| KR | 20160013266 A | 2/2016 |
| KR | 102082063 B1 | 2/2020 |

OTHER PUBLICATIONS

Tencent Technology, IPRP, PCT/CN2017/085834, Dec. 4, 2018, 6 pgs.
Tencent Technology, Malaysian Office Action, MY Patent Application No. PI2018702351, Apr. 30, 2024, 3 pgs.
Tencent Technology, Malaysia Office Action, Malaysia Patent Application No. PI 2018702351, Feb. 24, 2023, 3 pgs.

* cited by examiner

| Sequence number | Content of a media information operation message ||| Receiving moment |
| --- | --- | --- | --- | --- |
| | Identifier of a first user | Identifier of media information | Operation || |
| | | | Identifier | Meaning | |
| 1 | User A | Advertisement 1 | 3 | Comment | 9:25 |
| 2 | User B | News 1 | 1 | Like | 9:40 |
| 3 | User A | Advertisement 2 | 2 | Unlike | 10:00 |
| 4 | User C | Advertisement 1 | 1 | Like | 13:09 |
| 5 | User D | Advertisement 1 | 3 | Comment | 17:00 |
| ... | ... | ... | ... | ... | ... |

| Media information operation message | | Social relationship chain |
|---|---|---|
| Sequence number | Identifier of a first user | Identifier of a second user |
| 1 | User A | Friend A1 |
| | | FriendA2 |
| | | ... |
| | | Friend AN |
| ... | ... | ... |
| 4 | User C | Friend A1 |
| | | FriendC2 |
| | | ... |
| | | FriendCN |
| 5 | User D | Friend A1 |
| | | FriendD2 |
| | | ... |
| | | FriendDN |
| ... | ... | ... |

FIG. 3

| Second user | Social relationship chain | | |
|---|---|---|---|
| | First user therein | Popularity coefficient | Popularity level |
| Friend A1 | User A | 80% | Intimate relationship (direct friend) |
| | User C | 30% | Weak relationship chain (indirect friend) |
| | User D | 50% | Strong relationship chain (direct friend) |

FIG.4

| Preset type | Industry code | Special directing rule based on user attribute information |
|---|---|---|
| Wine advertisement | 1106 | forcedly directed to "age>=18" |
| Love and marriage advertisement | 301 | forcedly directed to "single" and "age>=18" |
| Maternity center advertisement | 2616 | forcedly directed to "married male+married female" |

FIG. 8a

| Type of an operating system to which media information belongs | Special directing rule based on an operating system in which a client is located |
|---|---|
| iOS | forcedly directed to an iOS user |
| Android | forcedly directed to an Android user |

FIG. 8b

MEDIA INFORMATION PRESENTATION METHOD, SERVER, AND STORAGE MEDIUM

CROSS-REFERENCE TO RELATED APPLICATIONS

This application is a continuation of U.S. application Ser. No. 16/030,750, entitled "MEDIA INFORMATION PRESENTATION METHOD, SERVER, AND STORAGE MEDIUM" filed on Jul. 9, 2018, which is a continuation-in-part application of PCT/CN2017/085834, entitled "MEDIA INFORMATION PRESENTATION METHOD, SERVER, AND STORAGE MEDIUM" filed on May 25, 2017, which claims priority to Chinese Patent Application No. 201610379714.7, filed with the State Intellectual Property Office of the People's Republic of China on Jun. 1, 2016, and entitled "MEDIA INFORMATION PRESENTATION METHOD, SERVER, AND STORAGE MEDIUM," all of which are incorporated herein by reference in their entirety.

FIELD OF THE TECHNOLOGY

This application relates to the field of Internet technologies, and in particular, to a media information presentation method, a server, and a storage medium.

BACKGROUND OF THE DISCLOSURE

At present, when a user conducts a social activity on a website or in an application (APP), in addition to receiving information released by a friend, the user further receives other pushed media information, for example, an advertisement, news or a public welfare film in a form of a text, an image, a teletext, or a video. A common promotion manner is called directional media information promotion manner. In the directional media information promotion, a user group to which a piece of media information is promoted in a directed manner is determined according to attribute information or historical behavior information of users in the user group. These users may be referred to as seed users, and the directional promotion is performed for these determined seed users.

However, in such a directional media information promotion manner, the seed users are determined in advance, and only those seed users are able to receive the media information. Since audiences are limited only to the seed users, the media information is not radiated to the other users even if they are associated with the seed users as colleagues, friends, family members, or the like. Only when the other users request for the media information from the seed users, the media information can be provided to the other users. Also, the time for request for the media information from the other users is proportional to the number of the other users. As a result, the directional media information promotion cannot be automatically radiated to the audiences other than the seed users, lacks interactivities among the users, and causes instability of online service.

SUMMARY

To resolve the problem in the existing technology, exemplary embodiments of the present disclosure provide a media information presentation method, server, and storage medium. The technical solutions are as follows:

A first aspect provides a media information presentation method performed at a computer server having one or more processors and memory storing instructions to be executed by the one or more processors that is communicatively connected to a plurality of terminals corresponding to a plurality of users of a social networking platform, the method comprising:
receiving, at the computer server, a plurality of media information operation messages, each message indicating an operation performed on a piece of advertisement by a respective one of a first group of users of the social networking platform;
deriving, at the computer server, a second group of users of the social networking platform, wherein each member of the second group of users is a direct connection of one or more of the first group of users on the social networking platform;
collecting, at the computer server and from the plurality of media information operation messages associated with the first group of users, statistics on operation statistical data of the second group of users, the operation statistical data comprising identifiers of a plurality of pieces of advertisement and an operation weight of each of the plurality of pieces of advertisement; and
receiving, at the computer server, a media information obtaining request from a respective user of the second group of users at a terminal;
in response to the media information obtaining request, identifying, from the operation statistical data, a plurality of pieces of advertisement corresponding to the respective user;
sorting the plurality of pieces of advertisement according to their corresponding operation weights associated with the respective user; and
returning, to the terminal, top L pieces of advertisement in the descending order, wherein L is a positive integer greater than or equal to 1.

A second aspect provides a computer server that is communicatively connected to a plurality of terminals associated with a social networking platform, including one or more processors; memory coupled to the one or more processors; a plurality of instructions stored in the memory that, when executed by the one or more processors, cause the computer server to perform the aforementioned operations.

A third aspect provides a non-transitory computer readable storage medium, storing a plurality of instructions configured for execution by one or more processors of a computer server, which is communicatively connected to a plurality of terminals associated with a social networking platform, the plurality of instructions, when executed by the one or more processors, causing the computer server to perform the aforementioned operations.

The technical solutions provided in the exemplary embodiments of the present disclosure bring about the following beneficial effects:

In the method and apparatus provided in the exemplary embodiments of the present disclosure, at least one media information operation message is received from at least one first client; a social relationship chain of the first user corresponding to each media information operation message is obtained; statistics on operation statistical data of each second user in each social relationship chain is collected according to each piece of determined media information and each determined operation; a second client receives a media information obtaining request of a third user; and when operation statistical data of the third user is found from the operation statistical data of the second user, at least one piece of media information is selected from the operation statistical data of third user, and the at least one piece of media information is sent to the second client, so that promotion of the media information is radiated to the second user and even to the third user by means of an operation of the first user and the social relationship chain. Therefore, the method and apparatus of the present disclosure can increase the channels of the media information promotion, enlarge the media information presentation range and promotion depth, so that audiences receiving the media information are extended from the directed group to a variable social group. In addition, the method and apparatus of the present disclosure can propagate the media information in real time, thereby lowering a response delay for a media information request and enhancing the efficiency of promoting the media information and resource utilization of the media information presentation.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

FIG. 3 is a schematic diagram of a list of social relationship chains according to an embodiment of this application;

FIG. 4 is a schematic diagram of a list of popularity coefficients according to an embodiment of this application;

FIG. 8a is a schematic diagram of an interface of a special directing rule according to an embodiment of this application;

FIG. 8b is a schematic diagram of an interface of a special directing rule according to another embodiment of this application:

DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the embodiments of this application, media information is presented as one type of promotion information, which may be an advertisement provided by an advertiser, or video files to be promoted or broadcasted, such as news, a public welfare film, and the like. A client terminal may be a social application client, for example, QQ zone, WeChat, Weibo, or the like. Users may establish a social relationship chain, and share, make a comment on, or perform other operations on received media information on a social application platform provided by the social application client.

Figures 1, 2:
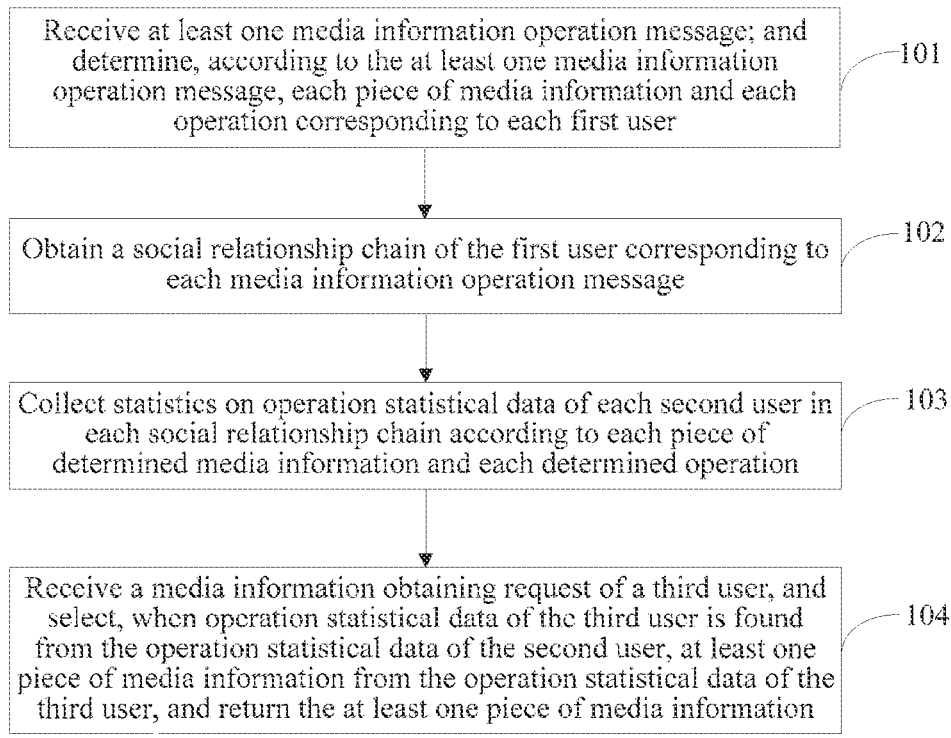
FIG. 1 is a schematic flowchart of a media information presentation method according to an embodiment of this application.
FIG. 2 is a schematic diagram of a list of media information operation messages according to an embodiment of this application.

FIG. 1 is a schematic flowchart of a media information presentation method according to an embodiment of this application. Referring to FIG. 1, the method includes the following steps.

Step 101: Receive at least one media information operation message, each media information operation message being used to indicate an operation performed by a first user on a piece of media information; and determine, according to the at least one media information operation message, each piece of media information and each operation corresponding to each first user.

In this step, the media information operation message may carry an identifier of the first user, an identifier of the media information, and an identifier of the performed operation. In some embodiments of this application, the operation performed by the first user on the media information may be an operation performed by the first user based on an interactive control provided by an application client for the media information, for example, based on an interactive button such as Like, Unlike, Down-vote, Un-vote, Repost, or Favorite provided by the application client for a piece of media information, a Like operation, an Unlike operation, or a Favorite operation performed by tapping the interactive button, or a comment operation performed based on an interactive control such as a comment text box provided by the application client for a piece of media information.

A server determines, according to at least one media information operation message received at a predetermined time interval, each piece of media information and each operation corresponding to each first user. In an embodiment, the server stores the at least one received media information operation message as log data specific to a user behavior, and the log data is used to collect statistics and generate a report specific to the media information operation message. For example, a data list is established. The data list includes a sequence number and content (including an identifier of the first user, an identifier of operated media information, and an identifier and a meaning of the operation) of each media information operation message, a moment at which the media information operation message is received, and the like. During specific implementation, an identifier corresponding to each operation may be preset in the server and the client.

FIG. 2 is a schematic diagram of a list of media information operation messages according to an embodiment of this application. As shown in FIG. 2, on a social application platform, a user A makes a comment on an advertisement 1, and then, a client (e.g., a terminal), which the user A logs into, sends a media information operation message to a server. The media information operation message has a sequence number of 1, and carries an identifier "user A" of a first user, an identifier "advertisement 1" of media information, and an identifier "3" corresponding to the comment operation, and a moment at which the server receives the media information operation message is 9:25. For another example, a user B performs a Like operation on news 1, and then, a client to which the user B logs into sends a media information operation message to the server. The media information operation message has a sequence number of 2, and carries an identifier "user B" of a first user, an identifier "news 1" of media information, and an identifier "1" corresponding to the Like operation, and a moment at which the server receives the media information operation message is 9:40. It may be learned that, media information operation messages received by the server may include operations performed by different first users on different media information.

In addition, in a media information operation message having a sequence number of 3, a first user is also the user A, operated media information is an advertisement 2, and an "Unlike" operation is performed. It may be learned that, media information operation messages received by the server may include operations performed by a same first user on different media information. On the other hand, "Unlike" and "Un-vote" operations are used as inverse operations, representing that a first user may have performed a Like operation, and later a Down-vote operation on the media information previously. Therefore, it may be learned that, media information operation messages received by the server may further include different operations performed by a same first user on a same piece of media information.

In addition, a user C performs a Like operation on the advertisement 1, and then, a client, which the user C logs into, sends a media information operation message to the server. The media information operation message has a sequence number of 4, and carries an identifier "user C" of a third user, the identifier "advertisement 1" of the media information, and an identifier "1" corresponding to the Like operation, and a moment at which the server receives the media information operation message is 13:09. For another example, a user D performs a comment operation on the advertisement 1, and then, a client, which the user D logs into, sends a media information operation message to the server. The media information operation message has a sequence number of 5, and carries an identifier "user D" of a fourth user, the identifier "advertisement 1" of the media information, and the identifier "3" corresponding to the comment operation, and a moment at which the server receives the media information operation message is 17:00. It may be learned that, media information operation messages received by the server may include operations performed by different first users on a same piece of media information.

Step 102: Obtain a social relationship chain of the first user corresponding to each media information operation message, the social relationship chain of the first user including at least one second user having a social relationship with the first user.

In this step, the social relationship chain of the first user is a set of all second users having a social relationship with the first user or a set of some second users having a social relationship with the first user. For example, the social relationship chain is a friendship chain, and a second user is a friend of the first user. Social relationship chains of multiple first users may include a same second user, that is, multiple first users have a common friend.

FIG. 3 is a schematic diagram of a list of social relationship chains according to an embodiment of this application. As shown in FIG. 3, corresponding to the media information operation message having the sequence number of 1 in FIG. 2, the corresponding first user is the user A. and a social relationship chain of the user A includes a friend A1, a friend A2, . . . , a friend AN. For another example, the first user corresponding to the media information operation message having the sequence number of 4 is the user C, and a social relationship chain of the user C includes a friend A1, a friend C2, . . . , and a friend CN. For another example, the first user corresponding to the media information operation message having the sequence number of 5 is the user D, and a social relationship chain of the user D includes a friend A1, a friend D2, . . . , and a friend DN. It may be learned that, friendship chains of the user A, the user C, and the user D include a same second user, namely, the friend A1.

Step 103: Collect statistics on operation statistical data of each second user in each social relationship chain according to each piece of determined media information and each determined operation.

In this step, for each of the at least one determined second user, statistics on the operation statistical data of the second user may be collected according to the log data. The operation statistical data of the second user includes identifiers of multiple pieces of media information and an operation weight of each piece of media information. Specifically, in some embodiments of this application, for each second user, statistics on each piece of media information and each operation corresponding to each first user in a social relationship chain of the second user may be collected, to obtain the operation statistical data of the second user. That is, an operation performed by a first user on media information is mapped to operation statistical data of a second user by using a social relationship chain, to represent media information to which the second user as a friend is radiated to.

For example, referring to FIG. 3, the second user is the friend A1, and first users in a social relationship chain of the friend A1 include the user A, the user C, and the user D. Referring to FIG. 2, the user A corresponds to the media information being the "advertisement 1" and the "comment" operation and corresponds to the media information being the "advertisement 2" and the "Unlike" operation; the user C corresponds to the media information being the "advertisement 1" and the "Like" operation; and the user D corresponds to the media information being the "advertisement 1" and the "comment" operation.

In this step, the operation statistical data is specific to each second user, and provides each piece of corresponding media information and the operation weight of each piece of media information. When statistics on the operation statistical data of each second user in each social relationship chain is collected, for each second user, first, all pieces of media information corresponding to each first user in the social relationship chain of the second user are determined and are identified as k–1, . . . , and K. For example, using an example in which the second user is the friend A1, at the predetermined time interval, media information corresponding to the first users in the social relationship chain of the friend A1 includes: the "advertisement 1", the "advertisement 2", . . . , and an "advertisement X".

The following operations are performed on each piece of media information corresponding to each first user in the social relationship chain of the second user:

A) Each operation performed on the media information and the at least one first user performing each operation are determined.

As described above, using an example in which the second user is the friend A1 and the media information is the "advertisement 1", operations performed on the advertisement 1 include the "comment" operation and the "Like" operation. First users performing the "comment" operation include the user A and the user D, and a first user performing the "Like" operation includes the user C.

B) For each operation, a sub weight of the operation is calculated according to a popularity coefficient of each first user performing the operation in the social relationship chain of the second user.

If a total quantity of first users performing a $j^{th}$ operation is Mj, and a popularity coefficient of an $i^{th}$ first user in the social relationship chain of the second user is denoted as Hi,j, where i=1, . . . , or Mj, for a $k^{th}$ piece of media information, a sub weight of a $j^{th}$ operation Wk,j may be calculated as:

$$W_{k,j} = \frac{\sum_{i=1}^{M} H_{i,j}}{M_j} \quad (1)$$

In an embodiment, multi-level division may be performed on a social relationship chain according to characteristic factors and interactive behaviors between every two users, and an application scenario. A corresponding popularity coefficient is determined for each user in the social relationship chain according to a popularity level of the user. For example, the characteristic factors include: frequency that two users contact each other on a social application platform, frequency of accessing a zone of a friend, a group of a friend obtained according to a relationship, a friend overlapping ratio, an interest matching degree, and the like. The interactive behaviors are operations performed on an information flow of a friend, and include a Like operation, a comment operation, and the like. The application scenario is a scenario in which the operation is performed on the information flow of the friend, for example, interaction performed in a birthday card.

In an embodiment, there are three popularity levels that are respectively an "intimate relationship (a direct friend)", a "strong relationship chain (a direct friend)" and a "weak relationship chain (an indirect friend)", and respectively correspond to popularity coefficients 80%, 50%, and 30%. Direct friends, who are friends in an intimate relationship, include parents, a lover, a person particularly concerned about, and the like. Direct friends, who are in a strong relationship chain, include a colleague, a classmate, an ordinary friend, a working partner, and the like. Indirect friends, who are in a weak relationship chain, include a friend of a direct friend, a person having a common friend group but not a direct friend, and the like. Division of the popularity levels and values of the popularity coefficients are merely examples above, and there may be another division manner. This is not specifically limited in this application.

FIG. 4 is a schematic diagram of a list of popularity coefficients according to an embodiment of this application. As shown in FIG. 4, in the first users, a popularity coefficient of the user A in the social relationship chain of the friend A1 is 80%, and a popularity coefficient of the user D in the social relationship chain of the friend A1 is 50%. Therefore, for the "comment" operation, it may be calculated, according to the foregoing formula (1), that a sub weight of the "comment" operation is 0.65. For another example, the first users further include the user C. A popularity coefficient of the user C in the social relationship chain of the friend A1 is 30%. Therefore, for the "Like" operation, it may be calculated, according to the foregoing formula (1), that a sub weight of the "Like" operation is 0.3.

C) An operation weight of each piece of media information is calculated according to a preset priority of each operation and the calculated sub weight of each operation.

If a priority factor of the $j^t$ operation is Pj, and total quantity of operations corresponding to the $k^{th}$ piece of media information is Mk, an operation weight Wk of the $k^{th}$ piece of media information is:

$$W_k = \sum_{i=1}^{M} W_{k,j} \cdot P_j \quad (2)$$

For example, a sorting result obtained in descending order of priorities of the operations is: the "comment" operation, the "Like" operation, the "Repost" operation, the "Favorite" operation, and the "Down-vote" operation, and corresponding priority factors are respectively 90%, 80%, 60%, 30%, and −10%. Opposite values of the "Like" operation and the "Down-vote" operation are used as priority factors of two inverse operations, that is, the "Unlike" operation and the "Un-vote" operation, that is, −80% and 10%. Therefore, in the foregoing example, an operation weight of the media information being the "advertisement 1" is 0.65*90%+ 0.3*80%=0.825.

It may be learned from the foregoing steps that, the operation statistical data of each second user includes identifiers of multiple pieces of media information and an operation weight of each piece of media information. In addition, the operation statistical data of each second user is stored by using the user identifier of each second user as an index, to indicate the user corresponding to the operation statistical data.

Step 104: Receive a media information obtaining request of a third user, and select, when operation statistical data of the third user is found from the operation statistical data of the second user, at least one piece of media information from the operation statistical data of the third user, and return the at least one piece of media information to a second client (a terminal).

When the third user logs into the second client, the second client sends a media information obtaining request to the server. The server searches the operation statistical data of each second user for the operation statistical data of the third user. In some embodiments of this application, the media information obtaining request may include a user identifier of the third user. In this case, the server may search, according to the user identifier of the third user, the operation statistical data of the second user stored in the server for the operation statistical data corresponding to the user identifier of the third user. When the operation statistical data is found, the at least one piece of media information is selected from the operation statistical data of the third user, and the at least one piece of media information is sent to the second client. A quantity of pieces of selected media information may be preset. For example, the quantity may be preset according to propagation needs of a media information promoter. Specifically, in some embodiments of this application, media information may be selected according to an operation weight of media information included in the operation statistical data. For example, a predetermined quantity of media information having a largest operation weight is selected, and the selected media information is returned to the second client. In some embodiments of this application, selection may be performed or further performed according to a special directing rule. In this application, the foregoing method for selecting media information according to an operation weight of the media information and/or a special directing rule is described in detail below.

In this embodiment, at least one media information operation message is received from at least one first client; a social relationship chain of the first user corresponding to each media information operation message is obtained; statistics on operation statistical data of each second user in each social relationship chain is collected according to each piece of determined media information and each determined operation; a second client receives a media information obtaining request of a third user; and when operation statistical data of the third user is found from the operation statistical data of the second user, at least one piece of media information is selected from the operation statistical data of third user, and the at least one piece of media information is sent to the second client, so that promotion of the media information is radiated to the second user by means of an operation of the first user and the social relationship chain. For example, a group to which media information is promoted in a directed manner does not include a second user, but by the above described technical solutions of the present disclosure, the second user can receive the media information. It may be learned that, media information promotion channel is found, and a media information presentation range and promotion depth are increased, so that audiences receiving the media information are extended from the directed group to a variable social group. In addition, the server collects statistics on the operation statistical data of the second user, and when receiving a media information obtaining request, may push the media information in real time, thereby lowering a response delay for a media information request. Therefore, by means of the technical solution, efficiency of promoting the media information and resource utilization of a media information presentation device are improved.

Figure 9:
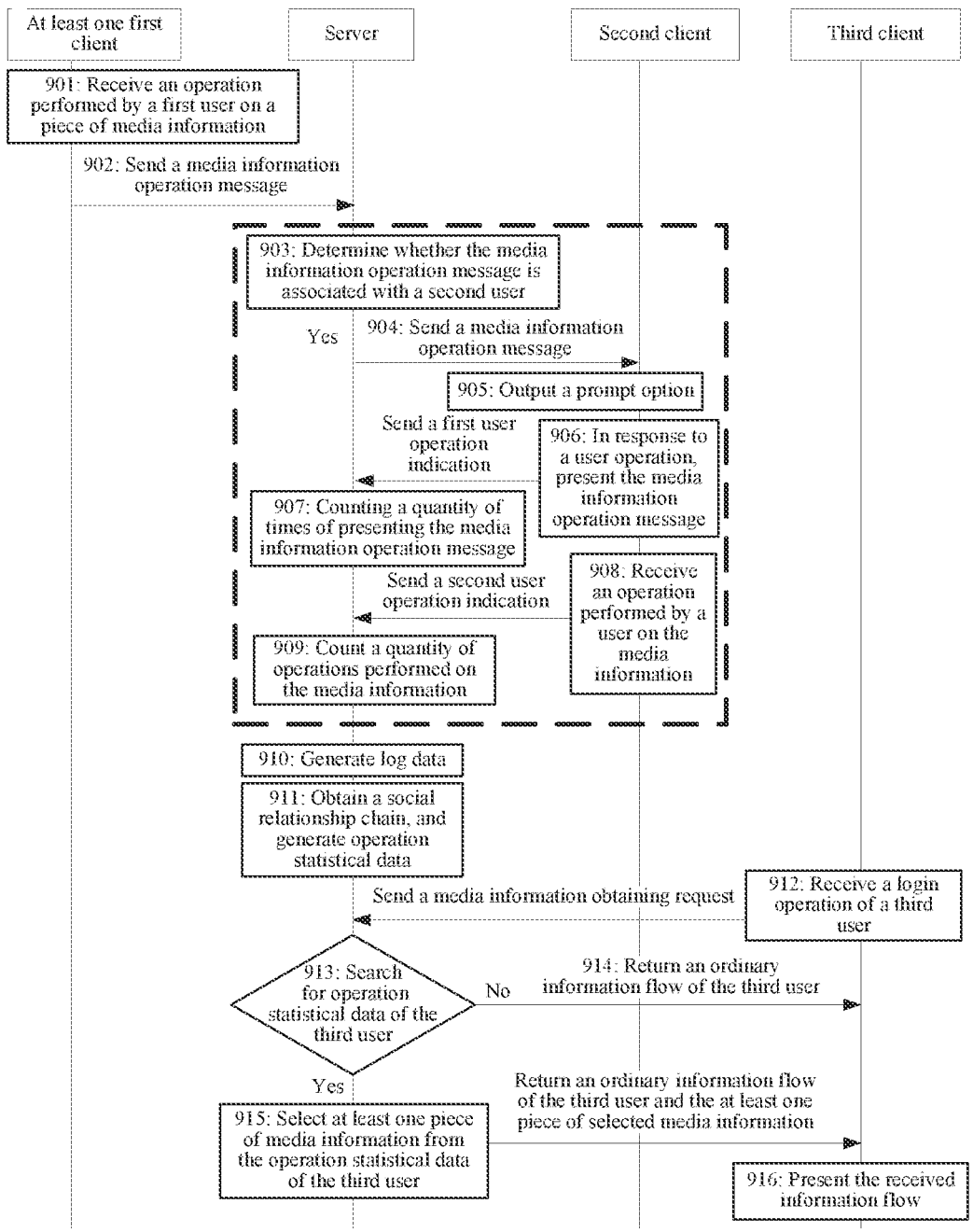
FIG. 9 is a schematic interaction diagram of a media information presentation method according to an embodiment of this application.
Figure 11:
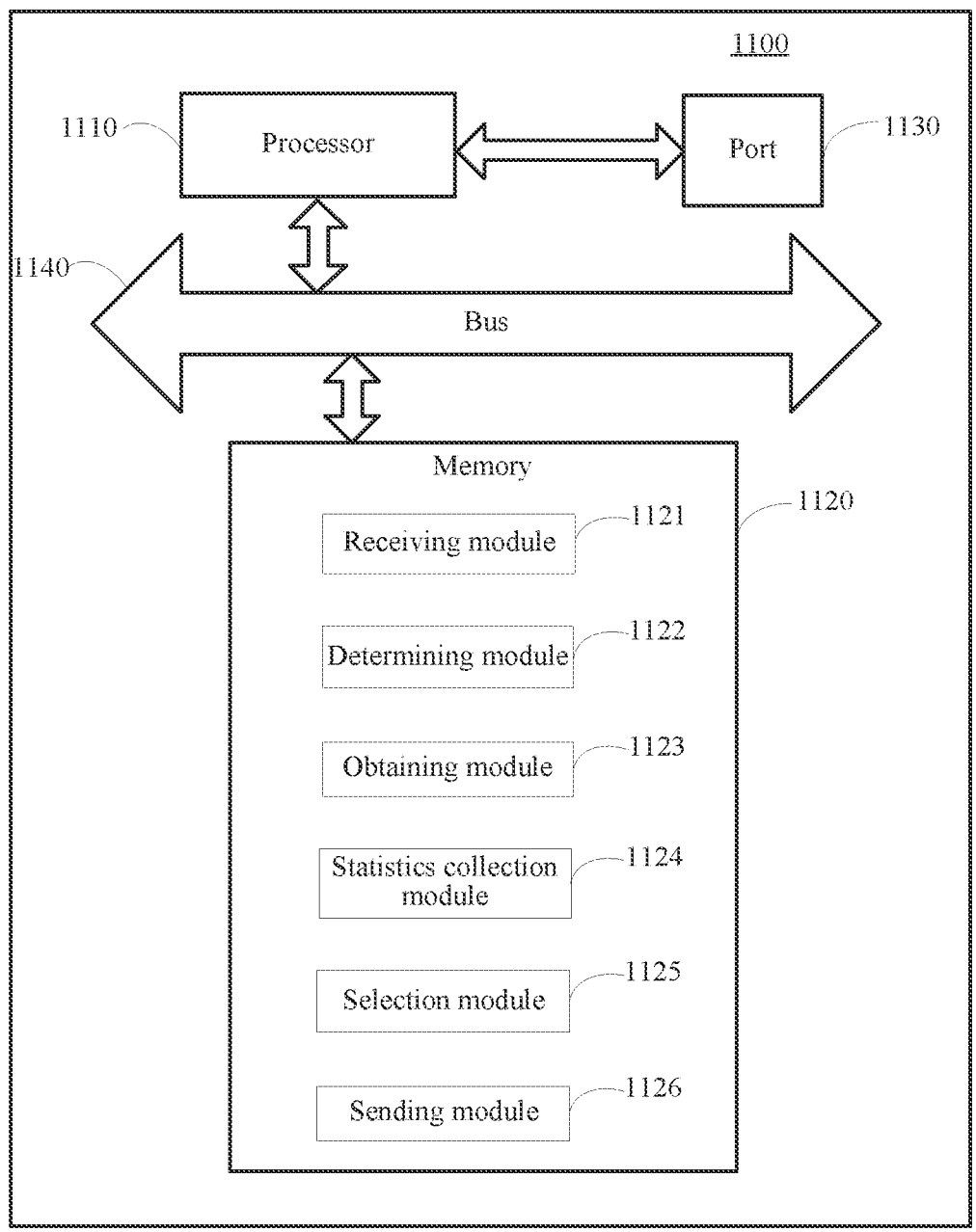
FIG. 11 is a schematic structural diagram of a server according to another embodiment of this application.

In some embodiments, a media information presentation method is performed at a computer server (1100 in FIG. 11) having one or more processors and memory storing instructions to be executed by the one or more processors that is communicatively connected to a plurality of clients (FIG. 9). The plurality of clients (terminals) correspond to a plurality of users including first users, second users, and third users. The first users are directly or indirectly associated with the second and third users.

The computer server 1100 receives at least one media information operation message that is used to indicate operations performed by a first user on one piece of media information, and determines a first user and media information that correspond to each media information operation message and operations performed by the first user on the media information. Then, the computer server 1100 generates log data, which include a sequence number of each media information operation message, an identifier of the corresponding first user, an identifier of the corresponding media information, and an identifier of the corresponding operation.

After that, the computer server 1100 obtains a social relationship chain of each of the first users. The social relationship chain of a first user includes at least one second user who has a social relationship with the first user. Then, with regarding to each of the second users, the computer server collects statistics on operation statistical data of the second user according to the log data. The operation statistical data of the second user include identifiers of a plurality of pieces of media information and operation weights of these pieces of media information.

Moreover, the computer server 1100 also receives a media information obtaining request from a third user. After receiving the request, if the computer server 1100 finds operation statistical data of the third user from the operation statistical data of the second user, the computer server selects at least one piece of media information from the operation statistical data of the third user, and returns the at least one piece of media information to the second user.

Figure 5:
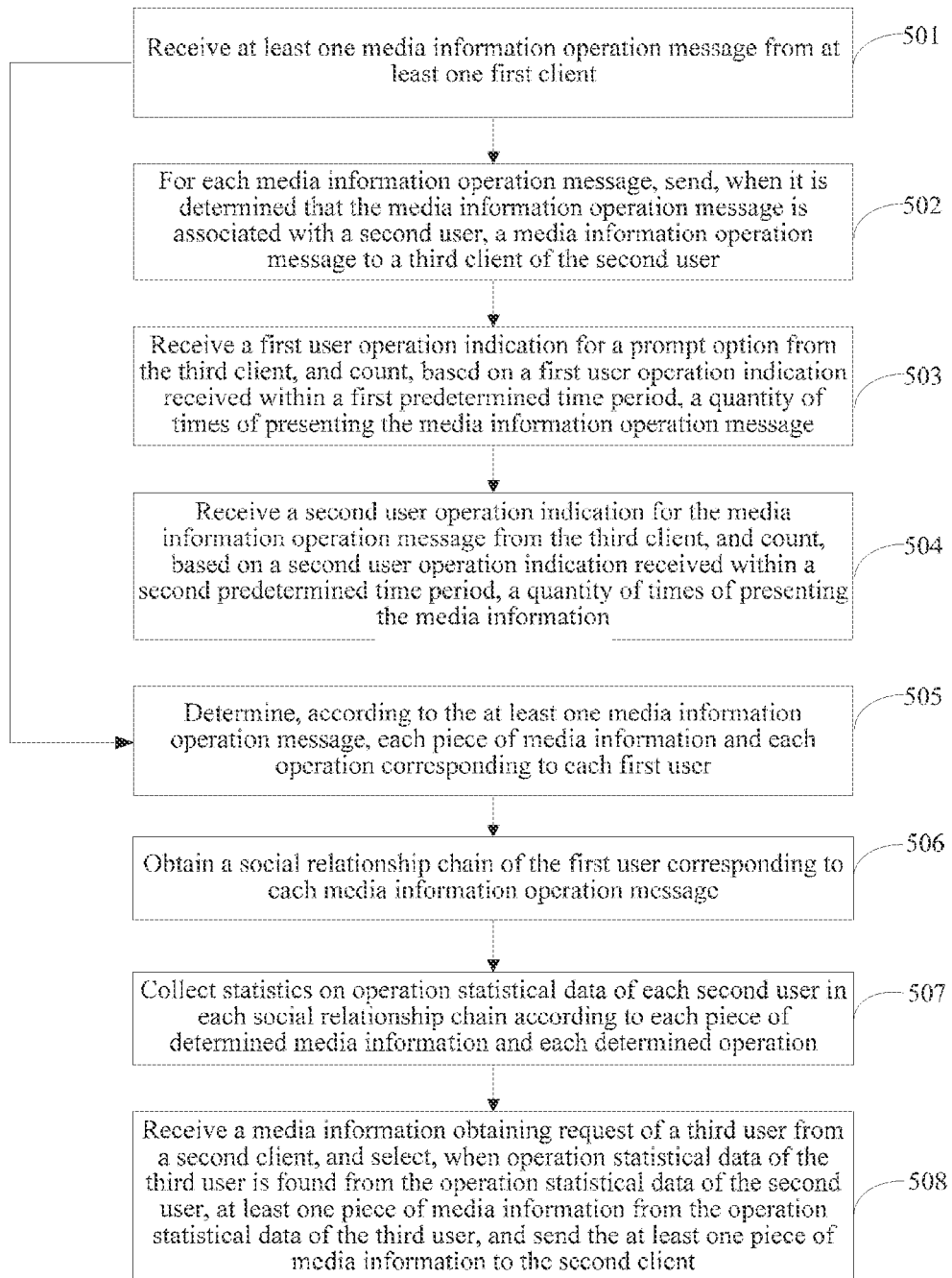
FIG. 5 is a schematic flowchart of a media information presentation method according to another embodiment of this application.

FIG. 5 is a schematic flowchart of a media information presentation method according to another embodiment of this application. As shown in FIG. 5, the method includes the following steps.

Step 501: Receive at least one media information operation message from at least one first client, each media information operation message being used to indicate an operation performed by a first user on a piece of media information.

In this step, each first client receives an operation performed by a first user on a piece of media information, and sends a media information operation message to a server.

Figure 6:
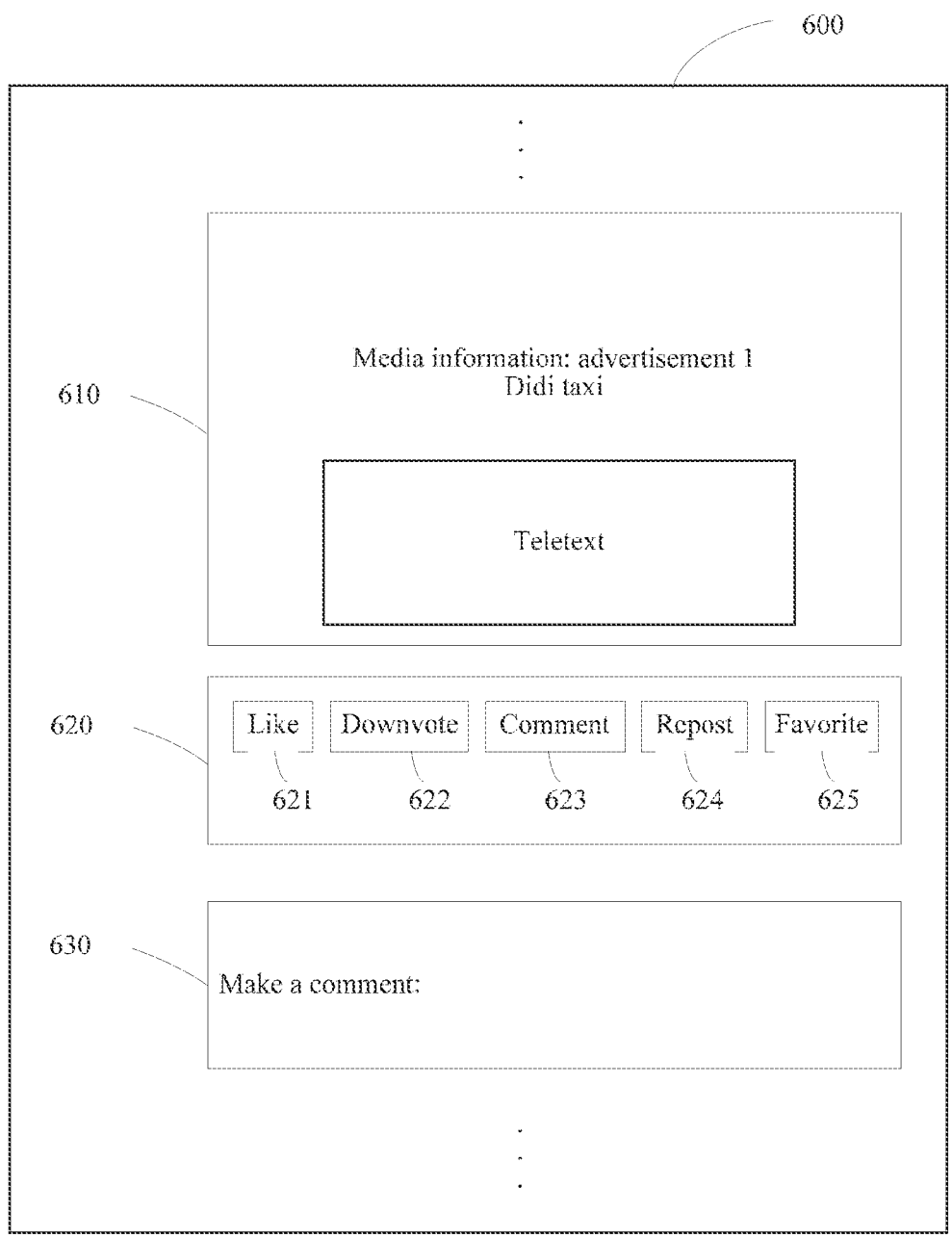
FIG. 6 is a schematic diagram of an interface of an operation on media information according to an embodiment of this application.

FIG. 6 is a schematic diagram of an interface of an operation on media information according to an embodiment of this application. As shown in FIG. 6, an information flow received by a first client is displayed on an interface 600. A piece of media information: an advertisement 1 is displayed in a box 610, a title is "Didi taxi", and a corresponding teletext is provided. Multiple user operation options are provided in the box 620, and include a Like option 621, a Down-vote option 622, a comment option 623, a Repost option 624, and a Favorite option 625. The Like option 621, the Down-vote option 622, and the comment option 623 all provide a comment function. The Like option 621 and the Down-vote option 622 are used to perform operations in terms of positive and negative aspects, and a user may perform a Like operation, an Unlike operation, a Down-vote operation, and an Un-vote operation. After tapping the comment option 623, the user enters specific comment information in a box 630.

After a first user logs into a first client (a terminal), and performs an operation on any one of the foregoing user operation options, the first client sends, to the server, a media information operation message carrying an identifier of the first user, an identifier of media information, and an identifier of the performed operation.

Step 502: For each media information operation message, send, when it is determined that the media information operation message is associated with a second user, a media information operation message to a third client (a terminal) where the second user locates.

Herein, that the media information operation message is associated with a second user means that, the operation performed by the first user on the media information is directed to a second user. For example, the operation performed by the first user on the media information is replying a comment that is previously made by the second user, or the first user adds an identifier of the second user when making a new comment, for example, uses a manner of "@ the second user". In this case, the media information operation carries not only the identifier of the operation message but also the added identifier of the second user.

Alternatively, that the media information operation message is associated with a second user means that: the first user has a special authority in a social relationship chain of the second user. For example, according to a preset social protocol, the first user in the social relationship chain of the second user is a special friend. Then, after the first user makes a comment, the server can determine, according to the preset social protocol, that the media information operation message is associated with the second user.

When it is determined that the media information operation message is associated with the second user, the server sends the media information operation message to the third client of the second user, so that the third client outputs a prompt option according to the media information operation message, and presents the media information operation message after receiving an operation performed by the second user on the prompt option.

Figure 7A:
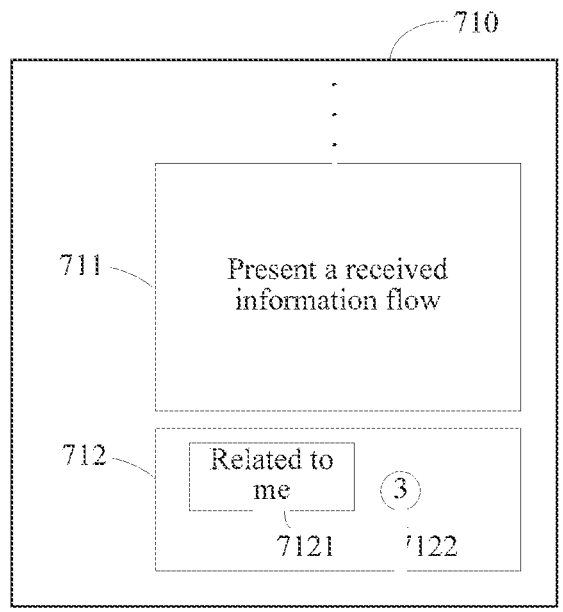
FIG. 7a is a schematic diagram of an interface for outputting a prompt option according to an embodiment of this application.

FIG. 7a is a schematic diagram of an interface for outputting a prompt option according to an embodiment of this application. As shown in FIG. 7a, on an interface 710 of the third client, an information flow oriented to a second user is displayed in a box 711, and may include information about a friend of the second user, media information initially directed to the second user, and one or more pieces of media information selected by the server according to operation statistical data. The prompt option is displayed in a box 712, and is represented by a text "related to me" in 7121, and a quantity 3 of media information operation messages displayed in 7122.

Figure 7B:
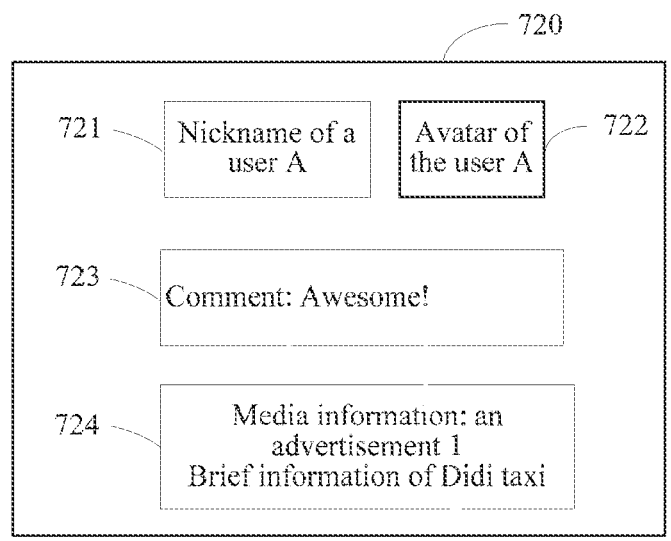
FIG. 7b is a schematic diagram of an interface for presenting a media information operation message according to an embodiment of this application.

FIG. 7b is a schematic diagram of an interface for presenting a media information operation message according to an embodiment of this application. When the second user taps 7121 or 7122 in FIG. 7a, the second client enters an interface 720 to present the media information operation message. For example, for a media information operation message, information about a first user is displayed, and includes a nickname of a user A displayed in a box 721 and an avatar of the user A displayed in a box 722. An operation performed by the first user is displayed in a box 723, that is, a text comment "Awesome!" is made. Media information operated by the first user is displayed in a box 724, for example, a form is a thumbnail of the advertisement 1 "Didi taxi".

Step 503: Receive a first user operation indication for the prompt option from the third client, and count, based on a first user operation indication received within a first predetermined time period, a quantity of times of presenting the media information operation message.

For example, as described above, after the third client enters from the interface in FIG. 7a to the interface in FIG. 7b, the media information operation message is presented. The server may count, by receiving the first user operation indication for the prompt option, a quantity of times of presenting the media information operation message to the second user.

Step 504: Receive a second user operation indication for the media information operation message from the third client, and count, based on a second user operation indication received within a second predetermined time period, a quantity of times of presenting the media information.

As described above, after the second user taps the box 724 in FIG. 7b, an interface of the third client is changed to an original interface in which a first user performs an operation on media information and shown in FIG. 6. In this way, the server counts, by receiving the second user operation indication for the media information, the quantity of times of presenting the media information.

Step 502 to step 504 include operations performed when media information operation message is associated with a second user, and passive information reminding is implemented for information promotion by using a social relationship chain. In addition, in the presentation method shown in FIG. 1, after step 501 is performed in the embodiment in FIG. 5, step 505 to step 508 may continue to be performed.

Step 505: Determine, according to the at least one media information operation message, each piece of media information and each operation corresponding to each first user.

Step 506: Obtain a social relationship chain of the first user corresponding to each media information operation message.

It is considered that a large quantity of second users are included in the social relationship chain of the first user. In this case, the server may select, from a complete social relationship chain according to a popularity coefficient of a friend, second users having higher popularity, for example, select second users whose popularity is ranked the top 100.

According to step 505 and step 506, the server may establish the following data structure for storage: {u0, sns_id, acttype, (u1, w1), (u2, w2) . . . , (u100, w100)}, where u0 indicates a first user performing an operation on media information, sns_id indicates an identifier of radiated media information, acttype indicates an identifier of the performed operation, ui (i=1, . . . , or 100) indicates a friend of u0, and wi indicates popularity of the friend in a social relationship chain of u0.

Step 507: Collect statistics on operation statistical data of each second user in each social relationship chain according to each piece of determined media information and each determined operation.

In an embodiment, in consideration of that a relatively large quantity of media information operation messages are received at the predetermined time interval, media information corresponding to first users in a social relationship chain of a second user may be eliminated. A specific method is as follows:

For each second user, for each piece of media information corresponding to each first user in the social relationship chain of the second user, a final moment at which a media information operation message corresponding to the media information is received is recorded; and all the pieces of media information are sorted in descending order according to the moments, and media information corresponding to top V moments are selected according to the sorting in descending order, for statistics collection, to obtain the operation statistical data of the second user, where V is a positive integer greater than or equal to 1.

For example, in the media information operation messages shown in FIG. 2, the first users in the social relationship chain of the friend A1 include the user A, the user C. and the user D. The three users all correspond to the media information being the "advertisement 1". In the received media information operation messages (the sequence numbers are respectively 1, 4, and 5) corresponding to the "advertisement 1", the media information operation message having the sequence number of 5 is finally received, and a final receiving moment is 17:00, and then, the "advertisement 1" corresponding to the moment is recorded. In this way, each piece of media information is recorded with a final receiving moment.

Then, all the pieces of media information are sorted in descending order according to the moments, and the media information corresponding to the top V moments are selected according to the sorting in descending order, to collect statistics on the operation statistical data of the second user. For example, V=100.

By means of this step, the server may establish a data structure of the operation statistical data for storage in a form of a key-a value. For example, the data structure may be represented as (key, value). Using an example in which operations are a Like operation and a comment operation, an operation weight of each piece of media information is stored as a sub weight of each operation, where a key is an identifier uin of a second user, and a value is {(sns_id0, zan_num, ping_num, zan_weight, ping_weight, timestamp) . . . (sns_id100, zan_num, ping_num, zan_weight, ping_weight, timestamp)}, where sns_id indicates an identifier of media information to which a friend is radiated, zan_num indicates a quantity of Like operations performed by a friend, ping_num indicates a quantity of comments made by a friend, zan_weight indicates a sub weight obtained after the quantity of Like operations and popularity of the friend performing a Like operation are integrated, ping_weight indicates a sub weight obtained after the quantity of comments and popularity of the friend making a comment are integrated, and timestamp indicates a final receiving moment. In Value, storage of 100 data packets may be limited, and the elimination is performed according to timestamp.

Step 508: Receive a media information obtaining request of a third user from a second client, and select, when operation statistical data of the third user is found from the operation statistical data of the second user, at least one piece of media information from the operation statistical data of the third user, and send the at least one piece of media information to the second client.

In this step, the server first searches the operation statistical data of each second user for the operation statistical data corresponding to the third user, that is, determines whether the third user has media information to which a friend of the third user is radiated. Then, the at least one piece of media information is selected from the operation statistical data of the third user. Specifically, the following two manners may be used.

A first manner: Selection is performed according to the operation weight of each piece of media information.

Specifically, as described in step 103, the operation statistical data includes identifiers of multiple pieces of media information and an operation weight of each piece of media information, the operation weights of all the pieces of media information in the operation statistical data of the third user are sorted in descending order, and the media information corresponding to the top L operation weights are selected according to the sorting in descending order, where L is a positive integer greater than or equal to 1. For example, when L=1, only one piece of media information in the operation statistical data is pushed each time.

Second manner: Selection is performed according to a special directing rule.

In an embodiment, the special directing rule is to associate a type of media information to user attribute information. If a piece of media information is of a preset type of media information and attribute information of the third user satisfies a preset attribute category, the media information is selected. The user attribute information includes a gender, an age, a marital status, or the like of a user.

FIG. 8*a* is a schematic diagram of an interface of a special directing rule according to an embodiment of this application. As shown in FIG. 8*a*, preset types of media information include a wine advertisement, a love and marriage advertisement, and a maternity center advertisement, and industry codes of the three types of advertisements are respectively provided. Under the special directing rule, based on attribute information of a third user, media information may be forcedly directed to "age>=18", "single" and "age>=18", and "married male+married female", respectively.

In another embodiment, the special directing rule is to perform association by using a type of an operating system. If a type of an operating system in which the second client is located is the same as a type of an operating system to which a piece of media information belongs, the media information is selected.

FIG. 8*b* is a schematic diagram of an interface of a special directing rule according to another embodiment of this application. As shown in FIG. 8*b*, for example, if a piece of media information is applied to an APP in an iOS operating system, the media information is pushed, in a directed manner, to a second client applied to the iOS operating system, that is, forcedly directed to an iOS user. For another example, if a piece of media information is applied to an APP in an Android operating system, the media information is pushed, in a directed manner, to a second client applied to the Android operating system, that is, forcedly directed to an Android user.

It should be noted that, the media information selection methods shown in the first manner and the second manner may be combined. For example, selection may be performed first according to the special directing rule in the second manner, and then, L pieces of media information having a largest operation weight are selected from the selected media information, as final selection results.

In this embodiment, for each media information operation message, when it is determined that the media information operation message is associated with a second user, a media information operation message is sent to a third client of the second user, so that passive information reminding is implemented for media information, more interaction in an advertisement is triggered, and coverage of advertisement promotion is improved. In addition, the server can collect, based on the first user operation indication and the second user operation indication that are received from the third client, statistics on exposure that the media information is passively radiated to a second user and exposure that the second user enters an advertisement detail page. This is advantageous to collect statistics on traffic for passive information reminding and evaluate a promotion effect achieved by passive reminding.

Further, media information to be presented to a friend is selected by using an operation weight of each piece of media information, so that media information that is originally not directed to the friend is presented; or media information that is not preferentially presented to the friend is preferentially pushed to the friend for presentation because of an increase in a weight, so that promotion of media information is not limited by original directing, efficient propagation is implemented from points to surfaces by using a social relationship chain, and more social expandable space is increased. In addition, media information to be presented is filtered by selecting the special directing rule, so that based on the social relationship chain, a directing rule for pushing media information to a friend is further limited, and directing policies that can be combined are provided, thereby meeting various promotion requirements of a media information promoter.

FIG. 9 is a schematic interaction diagram of a media information presentation method according to an embodiment of this application, performed by a server, at least one first client, a second client, and a third client. A first user corresponding to the first client initiates an operation on a piece of media information, a second user corresponding to the second client and a third user corresponding to the third client are respectively in a social relationship chain with the first user. The second user receives a passive information reminder, and the third user receives media information operated by the first user. As shown in FIG. 9, the method includes the following steps.

Step 901: Each first client receives an operation performed by a first user on a piece of media information.

Step 902: Each first client sends a media information operation message to the server.

Step 903: For each media information operation message, the server determines whether the media information operation message is associated with a second user. The second user is in a social relationship chain of the first user.

Step 904: When determining that the media information operation message is associated with a second user, the server sends a media information operation message to a second client of the second user.

Step 905: The second client outputs a prompt option according to the media information operation message.

Step 906: The second client presents the media information operation message after receiving an operation performed by the second user on the prompt option, and sends a first user operation indication for the prompt option to the server.

Step 907: The server counts, based on a first user operation indication received at a first predetermined time period, a quantity of times of presenting the media information operation message.

Step 908: The second client sends a second user operation indication to the server after receiving an operation performed by the second user on the media information operation message.

Step 909: The server counts, based on a second user operation indication received at a second predetermined time period, a quantity of times of presenting the media information.

By means of step 903 to step 909, passive information reminding is implemented for a friend in a social relationship chain.

Step 910: Determine, according to the at least one media information operation message, each piece of media information and each operation corresponding to each first user, and generate log data.

Step 911: The server obtains a social relationship chain of the first user corresponding to each media information operation message, and generate operation statistical data of each second user in each social relationship chain according to each piece of determined media information and each determined operation.

Step 912: The third client receives a login operation of a third user, and sends a media information obtaining request to the server.

Step 913: The server searches the operation statistical data of each second user for operation statistical data of the third user. If the operation statistical data of the third user is found, (the third user may belong to a set of second users, and in this case, the server can find the operation statistical data of the third user from the operation statistical data of the second user), step 915 is performed; otherwise, (that is, the third user does not belong to a set of second users, and in this case, the server cannot find the operation statistical data of the third user from the operation statistical data of the second user), step 914 is performed.

Step 914: The server returns an ordinary information flow of the third user to the third client, including information about a friend of the third user and one or more pieces of media information directed to the third user in advance.

Step 915: The server selects at least one piece of media information from the operation statistical data of the third user, and returns an ordinary information flow of the third user and the at least one piece of selected media information to the third client.

Step 916: The third client presents the information flow received from step 914 or step 915.

Figure 10:
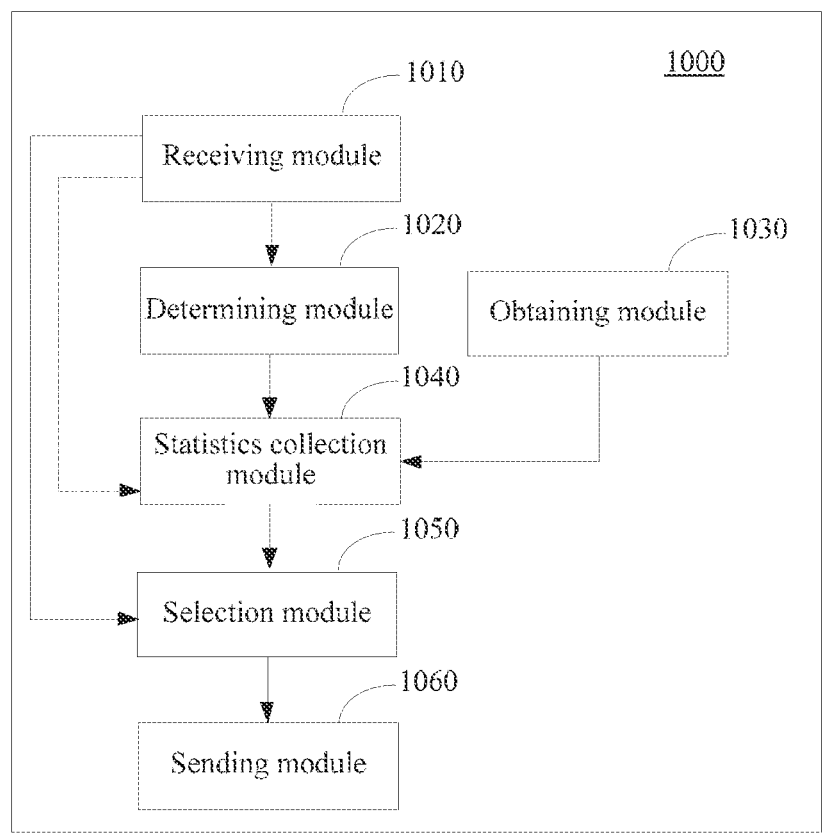
FIG. 10 is a schematic structural diagram of a server according to an embodiment of this application.

FIG. 10 is a schematic structural diagram of a server 1000 according to an embodiment of this application. As shown in FIG. 10, the server 1000 includes: a receiving module 1010, configured to: receive at least one media information operation message, each media information operation message being used to indicate an operation performed by a first user on a piece of media information; and receive a media information obtaining request of a third user;

a determining module 1020, configured to determine, according to the at least one media information operation message received by the receiving module 1010, each piece of media information and each operation corresponding to each first user;

an obtaining module 1030, configured to obtain a social relationship chain of the first user corresponding to each media information operation message, the social relationship chain of the first user including at least one second user having a social relationship with the first user;

a statistics collection module 1040, configured to collect statistics on operation statistical data of each second user in each social relationship chain according to each piece of media information and each operation that are determined by the determining module 1020 and the social relationship chain obtained by the obtaining module 1030, for each second user, statistics on each piece of media information and each operation corresponding to each first user in a social relationship chain of the second user being collected, to obtain the operation statistical data of the second user;

a selection module 1050, configured to select, based on the media information obtaining request received by the receiving module 1010, when operation statistical data of the third user is found from the operation statistical data of the second user obtained by the statistics collection module 1040, at least one piece of media information from the operation statistical data of the third user; and a sending module 1060, configured to return the at least one piece of media information selected by the selection module 1050.

In an embodiment, operations performed by a first user on a piece of media information include a Like operation, an Unlike operation, a Down-vote operation, an Un-vote operation, a comment operation, a Repost operation, a Favorite operation, and the like.

The statistics collection module 1040 is configured to: for each second user, perform the following operations on each piece of media information corresponding to each first user in the social relationship chain of the second user; determining each operation performed on the media information and the at least one first user performing each operation; for each operation, calculating a sub weight of the operation according to a popularity coefficient of each first user performing the operation in the social relationship chain of the second user; and calculating an operation weight of each piece of media information according to a preset priority of each operation and the calculated sub weight of each operation.

In an embodiment, the operation statistical data includes identifiers of multiple pieces of media information and an operation weight of each piece of media information.

The selection module 1050 is configured to: sort operation weights of all pieces of media information in the operation statistical data of the third user in descending order, and select, according to the sorting in descending order, media information corresponding to top L operation weights, where L is a positive integer greater than or equal to 1.

In an embodiment, the selection module 1050 is configured to: select, if a piece of media information is of a preset type of media information and attribute information of the third user satisfies a preset attribute category, the media information; and/or
   select, if a type of an operating system in which a client sending the media information obtaining request is located is the same as a type of an operating system to which a piece of media information belongs, the media information.

In an embodiment, the sending module 1060 is further configured to: for each media information operation message, send, when it is determined that the media information operation message is associated with a second user, the media information operation message to a client of the second user, so that the client outputs a prompt option according to the media information operation message, and presents the media information operation message after receiving an operation performed by the second user on the prompt option.

In an embodiment, the receiving module 1010 is further configured to receive a first user operation indication for the prompt option; and
   the statistics collection module 1040 is further configured to count, based on a first user operation indication received by the receiving module 1010 within a first predetermined time period, a quantity of times of presenting the media information operation message; and/or
   the receiving module 1010 is further configured to receive a second user operation indication for the media information operation message; and
   the statistics collection module 1040 is further configured to count, based on a second user operation indication received by the receiving module 1010 within a second predetermined time period, a quantity of times of presenting the media information.

In an embodiment, the statistics collection module 1040 is further configured to: for each second user, for each piece of media information corresponding to each first user in the social relationship chain of the second user, record a final moment at which a media information operation message corresponding to the media information is received; and sort all the pieces of media information in descending order according to the moments, and select, according to the sorting in descending order, media information corresponding to top V moments, for statistics collection, to obtain the operation statistical data of the second user, where V is a positive integer greater than or equal to 1.

FIG. 1 is a schematic structural diagram of a server 1100 according to another embodiment of this application. The server 1100 includes a processor 1110, a memory 1120, a port 1130, and a bus 1140. The processor 1110 and the memory 1120 are interconnected by using the bus 1140. The processor 1110 may receive and send data by using the port 1130.

The processor 1110 is configured to execute machine readable instruction modules stored in the memory 1120.

The memory 1120 stores the machine readable instruction modules that can be executed by the processor 1110. The instruction modules that can be executed by the processor 1110 includes a receiving module 1121, a determining module 1122, an obtaining module 1123, a statistics collection module 1124, a selection module 1125, and a sending module 1126.

When being executed by the processor 1110, the receiving module 1121 may receive at least one media information operation message, each media information operation message being used to indicate an operation performed by a first user on a piece of media information; and receive a media information obtaining request of a third user.

When being executed by the processor 1110, the determining module 1122 may determine, according to the at least one media information operation message received by the receiving module 1121, each piece of media information and each operation corresponding to each first user.

When being executed by the processor 1110, the obtaining module 1123 may obtain a social relationship chain of the first user corresponding to each media information operation message, the social relationship chain of the first user including at least one second user having a social relationship with the first user.

When being executed by the processor 1110, the statistics collection module 1124 may collect statistics on operation statistical data of each second user in each social relationship chain according to each piece of media information and each operation that are determined by the determining module 1122 and the social relationship chain obtained by the obtaining module 1123, for each second user, statistics on each piece of media information and each operation corresponding to each first user in a social relationship chain of the second user being collected, to obtain the operation statistical data of the second user.

When being executed by the processor 1110, the selection module 1125 may select, based on the media information obtaining request received by the receiving module 1121, when operation statistical data of the third user is found from the operation statistical data of the second user obtained by the statistics collection module 1124, at least one piece of media information from the operation statistical data of the third user.

When being executed by the processor 1110, the sending module 1126 may return the at least one piece of media information selected by the selection module 1125.

It may be learned from the above that, when being executed by the processor 1110, the instruction modules stored in the memory 1120 can implement various functions of the receiving module, the determining module, the obtaining module, the statistics collection module, the selection module, and the sending module in the foregoing embodiments.

In the foregoing apparatus embodiment, a specific method for implementing, by each module and unit, a function thereof is described in the method embodiment, and details are not described herein again.

In addition, functional modules in the embodiments of this application may be integrated into one processing unit, or each of the modules may exist alone physically, or two or more modules are integrated into one unit. The integrated unit may be implemented in a form of hardware, or may be implemented in a form of a software functional unit.

In addition, each embodiment of this application may be implemented by using a data processing device such as a data processing program performed by a computer. Apparently, the data processing program constitutes this application. In addition, a data processing program generally stored in a storage medium is performed by directly reading the program from the storage medium or installing or copying the program to a storage device (such as a hard disk and/or memory) of a data processing device. Therefore, such a storage medium also constitutes this application. The storage medium may use a record manner of any type, for example, a paper storage medium (such as a paper tape), a magnetic storage medium (such as a floppy disk, a hard disk, or a flash memory), an optical storage medium (such as a CD-ROM), or a magnetic optical storage medium (such as an MO).

Therefore, this application further discloses a storage medium, storing a data processing program. The data processing program is configured to perform any one of the embodiments of the method in this application.

The descriptions above are merely preferred embodiments of this application, and are not intended to limit this application. Any modification, equivalent replacement, or improvement made within the spirit and principle of this application shall fall within the protection scope of this application.

What is claimed is:

1. A media information presentation method performed at a computer server having one or more processors and memory storing instructions to be executed by the one or more processors that is communicatively connected to a plurality of terminals associated with a social networking platform, the method comprising:
    receiving, at the computer server, a plurality of media information operation messages, each message indicating an operation performed on a piece of advertisement by a respective one of a first group of users of the social networking platform;
    deriving, at the computer server, a second group of users of the social networking platform, wherein each member of the second group of users is a direct connection of one or more of the first group of users on the social networking platform;
    collecting, at the computer server and from the plurality of media information operation messages of the first group of users, statistics on operation statistical data of the second group of users, the operation statistical data comprising identifiers of a first plurality of pieces of advertisement and an operation weight of each of the first plurality of pieces of advertisement, wherein collecting statistics on the operation statistical data of the second group of users comprises:
        for a second user of the second group of users, collecting, according to the plurality of media information operation messages of the first group of users, statistics on at least one piece of advertisement corresponding to the first group of users comprised in a social relationship chain of the second user and corresponding operations on the at least one piece of advertisement by the first group of users, to obtain the operation statistical data of the second user for the at least one piece of advertisement;
        calculating a sub weight of each operation on the at least one piece of advertisement by each first user of the first group of users according to a popularity coefficient of the first user performing the operation in the social relationship chain of the second user, wherein the popularity coefficient of the first user reflects an intimacy level between the first user and the second user based, at least in part, on whether the first user and the second user are direct friends of each other or not and indicates an influence level of the first user on the second user for choosing the at least one piece of advertisement on the social networking platform and at least two different members of the first group of users have different popularity coefficients associated with the second user; and
        calculating an operation weight of the at least one piece of advertisement according to the calculated sub weights of operations on the at least one piece of advertisement by the first group of users; and
    receiving, at the computer server, an advertisement obtaining request from a respective user of the second group of users at a terminal;
    in response to the advertisement obtaining request,
        identifying, from the operation statistical data, a second plurality of pieces of advertisement corresponding to the respective user;
        ranking the second plurality of pieces of advertisement according to their corresponding operation weights by the first group of users; and
        returning to the terminal one or more top pieces of advertisement from the ranking of the second plurality of pieces of advertisement.

2. The method according to claim 1, wherein the operation performed by a user of the first group of users on the advertisement is a commenting or interaction operation performed by the user based on an interactive control provided by an application client.

3. The method according to claim 1, wherein the collecting statistics on at least one piece of advertisement corresponding to a first user of the first group of users comprised in a social relationship chain of the second user and a corresponding operation comprises:
    for the second user, determining, according to the plurality of media information operation messages of the first group of users, the first user comprised in the social relationship chain of the second user, the advertisement corresponding to the first user, and the operation corresponding to the first user; and
    calculating an operation weight of each piece of advertisement according to a preset priority of each operation and the calculated sub weight of each operation.

4. The method according to claim 1, wherein the identifying a plurality of pieces of advertisement corresponding to the respective user comprises:
    selecting the at least one piece of advertisement, if the at least one piece of advertisement is of a preset type of advertisement and attribute information of the respective user satisfies a preset attribute category.

5. The method according to claim 1, wherein the identifying a plurality of pieces of advertisement corresponding to the respective user comprises:
    selecting the at least one piece of advertisement, if the terminal associated with the respective user has a same operating system as one to which the at least one piece of advertisement belongs.

6. The method according to claim 1, wherein the collecting statistics on the operation statistical data of the second group of users comprises:
    for a plurality of pieces of advertisement corresponding to each member of the second group of users and the corresponding one or more of the first group of users, recording each of moments at which the media information operation message corresponding to each of the plurality of pieces of advertisement is received; and sorting the plurality of pieces of advertisement in a chronologically descending order, and selecting, according to the sorting in the chronologically descending order, one or more top pieces of advertisement from the sorted chronologically descending order from a newest to an oldest, for statistics collection, to obtain the operation statistical data of the member of the second group of users from the plurality of media information operation messages of the first group of users, wherein V is a positive integer greater than or equal to 1.

7. A computer server that is communicatively connected to a plurality of terminals associated with a social networking platform, comprising:

one or more processors;

memory coupled to the one or more processors; and a plurality of instructions stored in the memory that, when executed by the one or more processors, cause the computer server to perform the following operations:

receiving, at the computer server, a plurality of media information operation messages, each message indicating an operation performed on a piece of advertisement by a respective one of a first group of users of the social networking platform;

deriving, at the computer server, a second group of users of the social networking platform, wherein each member of the second group of users is a direct connection of one or more of the first group of users on the social networking platform;

collecting, at the computer server and from the plurality of media information operation messages of the first group of users, statistics on operation statistical data of the second group of users, the operation statistical data comprising identifiers of a first plurality of pieces of advertisement and an operation weight of each of the first plurality of pieces of advertisement, wherein collecting statistics on the operation statistical data of the second group of users comprises:

for a second user of the second group of users, collecting, according to the plurality of media information operation messages of the first group of users, statistics on at least one piece of advertisement corresponding to the first group of users comprised in a social relationship chain of the second user and corresponding operations on the at least one piece of advertisement by the first group of users, to obtain the operation statistical data of the second user for the at least one piece of advertisement;

calculating a sub weight of each operation on the at least one piece of advertisement by each first user of the first group of users according to a popularity coefficient of the first user performing the operation in the social relationship chain of the second user, wherein the popularity coefficient of the first user reflects an intimacy level between the first user and the second user based, at least in part, on whether the first user and the second user are direct friends of each other or not and indicates an influence level of the first user on the second user for choosing the at least one piece of advertisement on the social networking platform and at least two different members of the first group of users have different popularity coefficients associated with the second user; and calculating an operation weight of the at least one piece of advertisement according to the calculated sub weights of operations on the at least one piece of advertisement by the first group of users; and receiving, at the computer server, an advertisement obtaining request from a respective user of the second group of users at a terminal;

in response to the advertisement obtaining request, identifying, from the operation statistical data, a second plurality of pieces of advertisement corresponding to the respective user;

ranking the second plurality of pieces of advertisement according to their corresponding operation weights by the first group of users; and returning, to the terminal, one or more top pieces of advertisement from the ranking of the second plurality of pieces of advertisement.

8. The computer server according to claim 7, wherein the operation performed by a user of the first group of users on the advertisement is a commenting or interaction operation performed by the user based on an interactive control provided by an application client.

9. The computer server according to claim 7, wherein the collecting statistics on at least one piece of advertisement corresponding to a first user of the first group of users comprised in a social relationship chain of the second user and a corresponding operation comprises:

for the second user, determining, according to the plurality of media information operation messages of the first group of users, the first user comprised in the social relationship chain of the second user, the advertisement corresponding to the first user, and the operation corresponding to the first user; and calculating an operation weight of each piece of advertisement according to a preset priority of each operation and the calculated sub weight of each operation.

10. The computer server according to claim 7, wherein the identifying a plurality of pieces of advertisement corresponding to the respective user comprises:

selecting the at least one piece of advertisement, if the at least one piece of advertisement is of a preset type of advertisement and attribute information of the respective user satisfies a preset attribute category.

11. The computer server according to claim 7, wherein the identifying a plurality of pieces of advertisement corresponding to the respective user comprises:

selecting the at least one piece of advertisement, if the terminal associated with the respective user has a same operating system as one to which the at least one piece of advertisement belongs.

12. The computer server according to claim 7, wherein the collecting statistics on the operation statistical data of the second group of users comprises:

for a plurality of pieces of advertisement corresponding to each member of the second group of users and the corresponding one or more of the first group of users, recording each of moments at which the media information operation message corresponding to each of the plurality of pieces of advertisement is received; and sorting the plurality of pieces of advertisement in a chronologically descending order, and selecting, according to the sorting in the chronologically descending order, one or more top pieces of advertisement from the sorted chronologically descending from a newest to an oldest, for statistics collection, to obtain the operation statistical data of the member of the second group of users from the plurality of media information operation messages of the first group of users, wherein V is a positive integer greater than or equal to 1.

13. A non-transitory computer readable storage medium storing a plurality of instructions configured for execution by one or more processors of a computer server, which is communicatively connected to a plurality of terminals associated with a social networking platform, the plurality of instructions, when executed by the one or more processors, causing the computer server to perform the following operations:
receiving, at the computer server, a plurality of media information operation messages, each message indicating an operation performed on a piece of advertisement by a respective one of a first group of users of the social networking platform;
deriving, at the computer server, a second group of users of the social networking platform, wherein each member of the second group of users is a direct connection of one or more of the first group of users on the social networking platform;
collecting, at the computer server and from the plurality of media information operation messages of the first group of users, statistics on operation statistical data of the second group of users, the operation statistical data comprising identifiers of a first plurality of pieces of advertisement and an operation weight of each of the first plurality of pieces of advertisement, wherein collecting statistics on the operation statistical data of the second group of users comprises:
for a second user of the second group of users, collecting, according to the plurality of media information operation messages of the first group of users, statistics on at least one piece of advertisement corresponding to the first group of users comprised in a social relationship chain of the second user and corresponding operations on the at least one piece of advertisement by the first group of users, to obtain the operation statistical data of the second user for the at least one piece of advertisement;
calculating a sub weight of each operation on the at least one piece of advertisement by each first user of the first group of users according to a popularity coefficient of the first user performing the operation in the social relationship chain of the second user, wherein the popularity coefficient of the first user reflects an intimacy level between the first user and the second user based, at least in part, on whether the first user and the second user are direct friends of each other or not and indicates an influence level of the first user on the second user for choosing the at least one piece of advertisement on the social networking platform and at least two different members of the first group of users have different popularity coefficients associated with the second user; and
calculating an operation weight of the at least one piece of advertisement according to the calculated sub weights of operations on the at least one piece of advertisement by the first group of users; and receiving, at the computer server, an advertisement obtaining request from a respective user of the second group of users at a terminal;
in response to the advertisement obtaining request,
identifying, from the operation statistical data, a second plurality of pieces of advertisement corresponding to the respective user;
ranking the second plurality of pieces of advertisement according to their corresponding operation weights by the first group of users; and
returning to the terminal one or more top pieces of advertisement from the ranking of the second plurality of pieces of advertisement.

14. The non-transitory computer readable storage medium according to claim 13, wherein the operation performed by a user of the first group of users on the advertisement is a commenting or interaction operation performed by the user based on an interactive control provided by an application client.

15. The non-transitory computer readable storage medium according to claim 13, wherein the identifying a plurality of pieces of advertisement corresponding to the respective user comprises:
selecting the at least one piece of advertisement, if the at least one piece of advertisement is of a preset type of advertisement and attribute information of the respective user satisfies a preset attribute category.

16. The non-transitory computer readable storage medium according to claim 13, wherein the identifying a plurality of pieces of advertisement corresponding to the respective user comprises:
selecting the at least one piece of advertisement, if the terminal associated with the respective user has a same operating system as one to which the at least one piece of advertisement belongs.

17. The non-transitory computer readable storage medium according to claim 13, wherein the collecting statistics on the operation statistical data of the second group of users comprises:
for a plurality of pieces of advertisement corresponding to each member of the second group of users and the corresponding one or more of the first group of users, recording each of moments at which the media information operation message corresponding to each of the plurality of pieces of advertisement is received; and
sorting the plurality of pieces of advertisement in a chronologically descending order from a newest to an oldest, and selecting, according to the sorting in the chronologically descending order, one or more top pieces of advertisement from the sorted chronologically descending order, for statistics collection, to obtain the operation statistical data of the member of the second group of users from the plurality of media information operation messages of the first group of users, wherein V is a positive integer greater than or equal to 1.

* * * * *